(12) United States Patent
Gammill et al.

(10) Patent No.: US 11,260,824 B2
(45) Date of Patent: Mar. 1, 2022

(54) THROAT AND FILL TUBE PROTECTION DEVICE FOR AN INFLATABLE AIRBAG AND RELATED METHOD

(71) Applicant: AUTOLIV ASP, INC., Ogden, UT (US)

(72) Inventors: Kurt Gammill, Layton, UT (US); Jeffrey Low, Layton, UT (US)

(73) Assignee: Autoliv Development AB, Vargarda (SE)

( * ) Notice: Subject to any disclaimer, the term of this patent is extended or adjusted under 35 U.S.C. 154(b) by 128 days.

(21) Appl. No.: 16/777,052

(22) Filed: Jan. 30, 2020

(65) Prior Publication Data

US 2021/0237678 A1 Aug. 5, 2021

(51) Int. Cl.
*B60R 21/16* (2006.01)
*B60R 21/261* (2011.01)
*B60R 21/217* (2011.01)

(52) U.S. Cl.
CPC .......... *B60R 21/261* (2013.01); *B60R 21/217* (2013.01); *B60R 2021/2612* (2013.01)

(58) Field of Classification Search
CPC ................ B60R 21/261; B60R 21/217; B60R 2021/2612
USPC ...................................................... 280/730.2
See application file for complete search history.

(56) References Cited

U.S. PATENT DOCUMENTS

| | | | |
|---|---|---|---|
| 7,963,549 B2 | 6/2011 | Schneider et al. | |
| 8,851,507 B1 | 10/2014 | Kemp et al. | |
| 9,067,564 B2 | 6/2015 | Kemp et al. | |
| 9,415,742 B1* | 8/2016 | Sasakura | B60R 21/2346 |
| 9,566,933 B2* | 2/2017 | Jinnai | B60R 21/2171 |
| 9,956,935 B2* | 5/2018 | Kawamura | B60R 21/232 |
| 2010/0084841 A1* | 4/2010 | Suemitsu | B60R 21/2346 280/730.2 |
| 2010/0164209 A1* | 7/2010 | Magnin | B60R 21/2346 280/740 |
| 2013/0200596 A1* | 8/2013 | Goto | B60R 21/232 280/728.2 |
| 2014/0239620 A1* | 8/2014 | Kawamura | B60R 21/213 280/730.2 |

OTHER PUBLICATIONS

U.S. Appl. No. 16/777,013, filed Jan. 30, 2020, all pages.

\* cited by examiner

*Primary Examiner* — Toan C To
(74) *Attorney, Agent, or Firm* — Harness, Dickey & Pierce, P.L.C.; Stephen T. Olson

(57) ABSTRACT

A throat and fill tube protection device for an inflatable airbag includes a first portion, a second portion and an overlapping region. The first portion is a generally Y-shaped portion with a first arm and a second arm connected at a base. The first arm defines an inlet for receiving an inflator. The second arm defines a first channel for directing a first portion of the inflation gases in a first direction. The second portion defines a second channel for directing a second portion of the inflation gases in a second direction. The second direction is generally opposite the first direction. The overlapping region is cooperatively defined by first and second overlapping areas of the first and second portions, respectively.

19 Claims, 9 Drawing Sheets

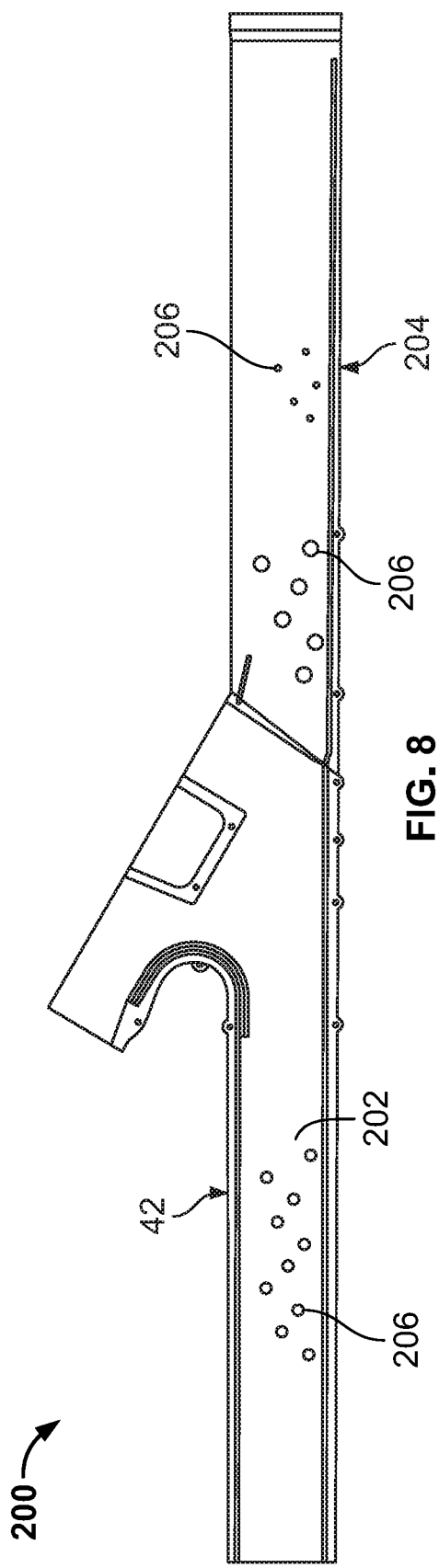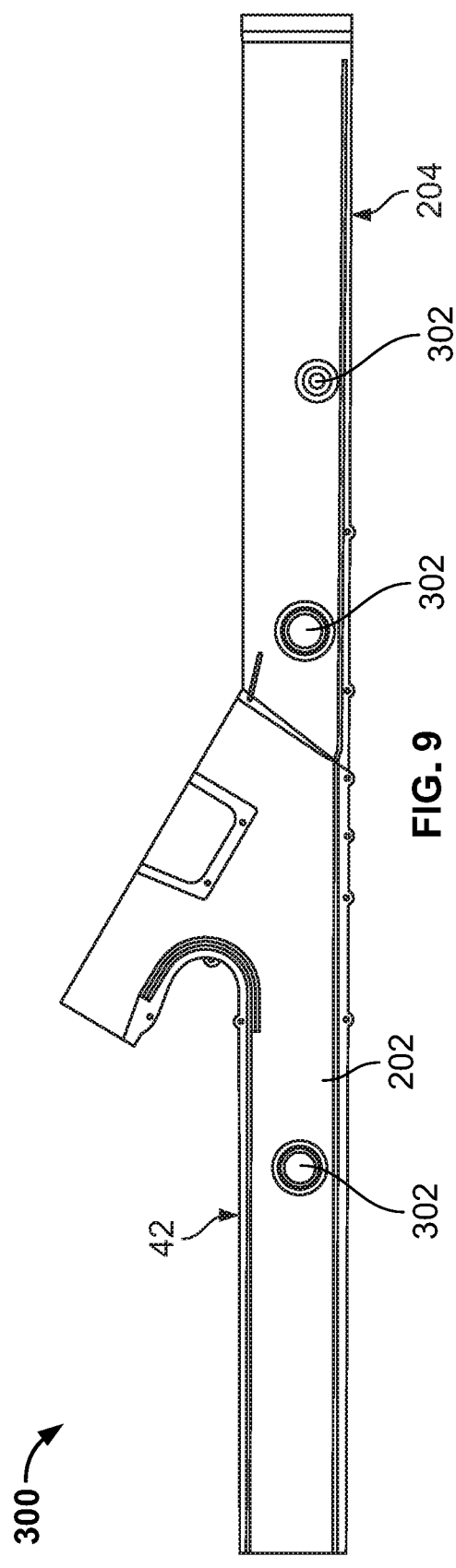

THROAT AND FILL TUBE PROTECTION DEVICE FOR AN INFLATABLE AIRBAG AND RELATED METHOD

FIELD

The present disclosure relates to inflatable restraints for motor vehicle safety systems. More particularly, the present disclosure relates to an airbag assembly for a motor vehicle with an inflation gas throat and fill tube protection device. The present disclosure also relates to method of manufacturing a gas throat and fill tube protection device for an airbag assembly.

BACKGROUND

This section provides background information related to the present disclosure which is not necessarily prior art.

Inflatable safety restraint devices or airbags are commonly included on motor vehicles. In the event of an accident, a sensor within the vehicle measures abnormal deceleration or other accident indicating data and triggers ignition of a charge contained within an inflator. Inflation gases from the charge fill the airbag. In addition to airbag systems designed for frontal impacts, conventional airbag systems include airbag systems for the protection of vehicle occupants from lateral impacts, oblique impacts and vehicle rollovers. The airbags instantaneously inflate to protect passengers within the vehicle from harmful impact with the interior of the vehicle.

While known airbag assemblies have generally proven to be suitable for their intended uses, a continuous need for improvement in the relevant art remains. For example, it remains desirable to reduce costs by effectively utilizing less expensive airbag materials while maintaining integrity in fill tube and throat regions.

SUMMARY

This section provides a general summary of the disclosure, and is not a comprehensive disclosure of its full scope or all of its features.

In accordance with one particular aspect, the present teachings provide a throat and fill tube protection device for an inflatable airbag including a first portion at a first end, a second portion at a second end and an overlapping region. The first portion is a generally Y-shaped portion with a first arm and a second arm connected at a base. The first arm defines an inlet for receiving an inflator. The second arm defines a first channel for directing a first portion of the inflation gases in a first direction. The second portion defines a second channel for directing a second portion of the inflation gases in a second direction. The second direction is generally opposite the first direction. The overlapping region is cooperatively defined by first and second overlapping areas of the first and second portions, respectively.

In accordance with another aspect, the present teachings provide a curtain airbag assembly for a motor vehicle including an inflatable airbag and a device for protecting a throat and a fill tube of the inflatable cushion. The inflatable airbag is formed from one or more panels defining one or more inflatable chambers that expand upon deployment of the inflatable airbag from a stowed state to a deployed state. The inflatable cushion is configured to be positioned in the deployed state between an occupant of the motor vehicle and an outboard portion of the vehicle to protect the occupant in the event of a vehicle roll-over or side-impact collision. The inflatable airbag includes an airbag inlet in fluid communication with a throat and a fill tube in fluid communication with the throat. The throat and fill tube protection device includes a Y-shaped portion and a further portion. The Y-shaped portion has a first arm and a second arm connected at a base. The first arm defines an inlet channel for receiving an inflator. The first arm is disposed in the airbag inlet. The second arm defines a first channel for directing a first portion of the inflation gases in a first direction. The further portion defines a second channel for directing a second portion of the inflation gases in a second direction that is generally opposite the first direction. A predetermined angle is defined between the Y-shaped portion and the further portion by an overlapping region of the Y-shaped portion and the further portion. The throat and fill tube protection device lines the throat and at least a portion of the fill tube.

In accordance with still another particular aspect, the present teachings provide a method of manufacturing a throat and fill tube protection device for an inflatable airbag. The method includes cutting at least one layer of material to a predetermined shape and stacking each layer of material. The method additionally includes tucking and folding each layer of material to define an overlapping region extending from a first longitudinally extending side of each layer to a second longitudinally extending side of each layer. Each layer is folded along a longitudinally extending fold line. The method further includes securing the first and second longitudinally extending sides to one another at a closure seam such that the device includes a first portion on a first side of the overlapping region and a second portion on a second, opposite side of the overlapping region. The first portion is Y-shaped and configured to receive inflation gases from an inflator and direct a first portion of the inflation gases in a first direction. The second portion is configured to direct a second portion of the inflation gases in a second, opposite direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
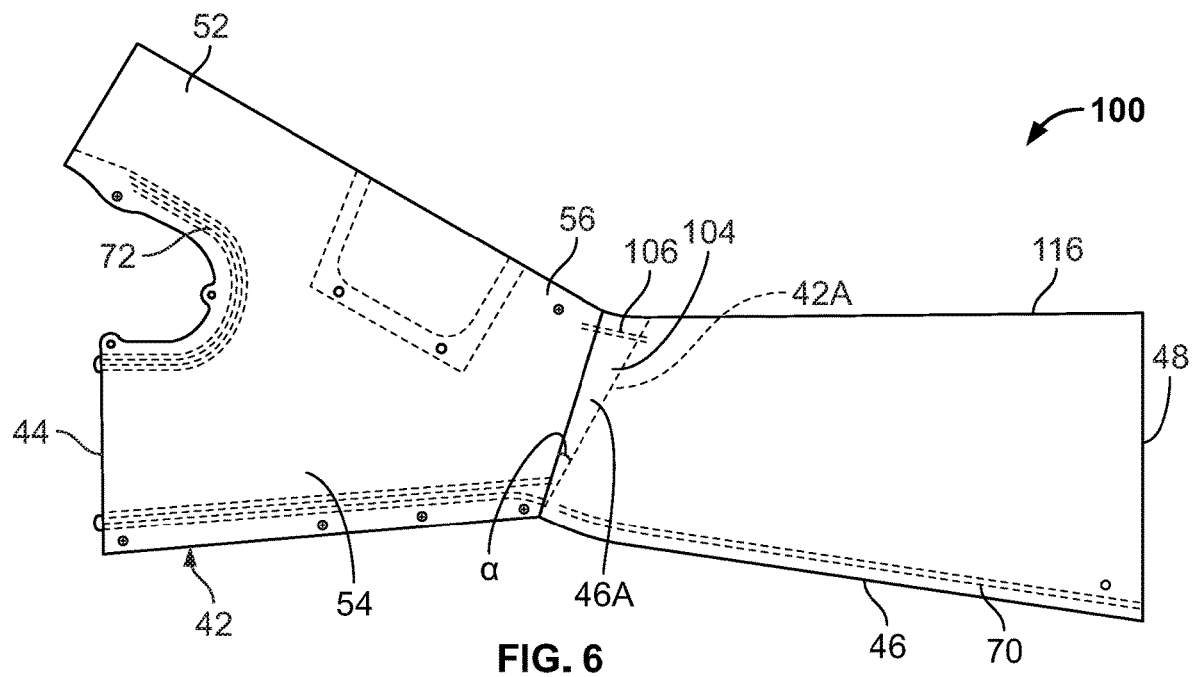

FIG. 6 side view of another throat and fill tube protection device for an airbag assembly in accordance with the present teachings.

Figure 7A:
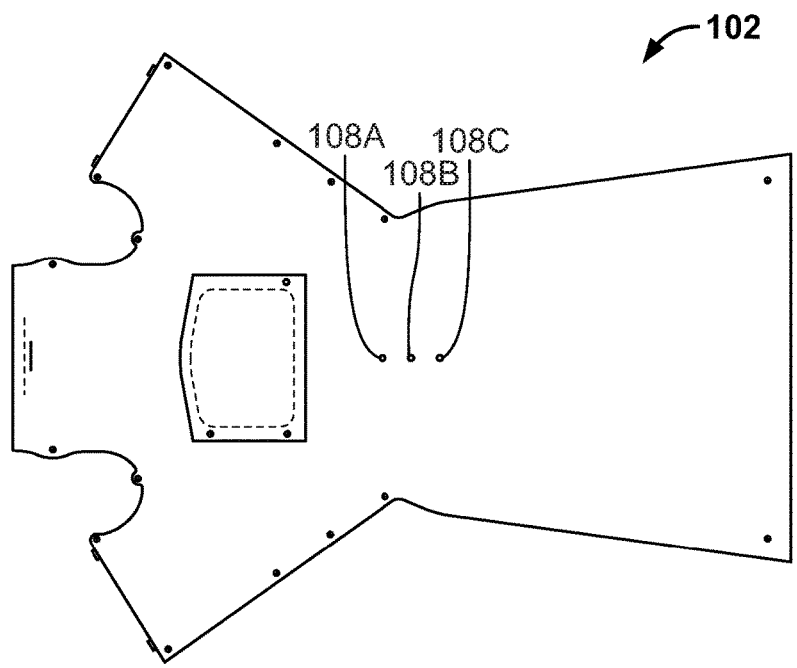

FIG. 7A illustrates a first general step for manufacturing a throat and fill tube protection device in accordance with the present teachings in which at least a first material layer is cut to a predetermined shape.

Figure 7B:
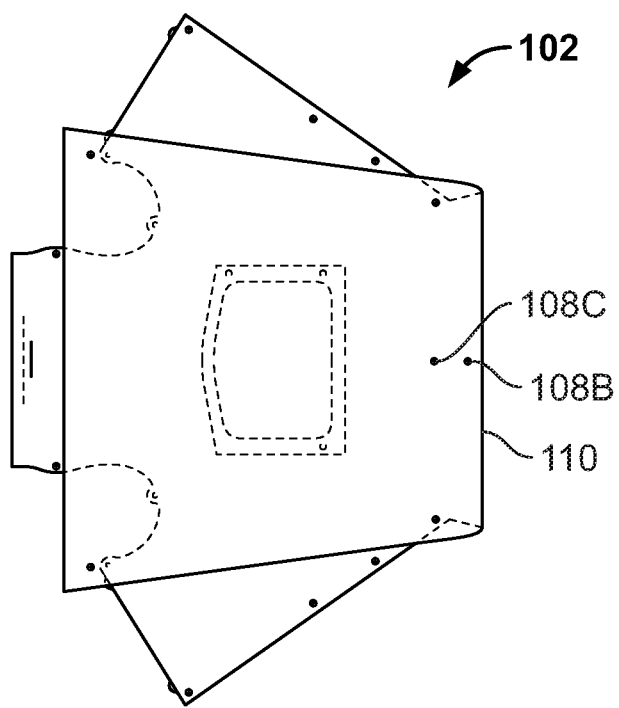

FIG. 7B illustrates a second general step for manufacturing a throat and fill tube protection device in accordance with the present teachings in which the predetermined shape of the at least first material layer is folded along a first fold line.

Figure 7C:
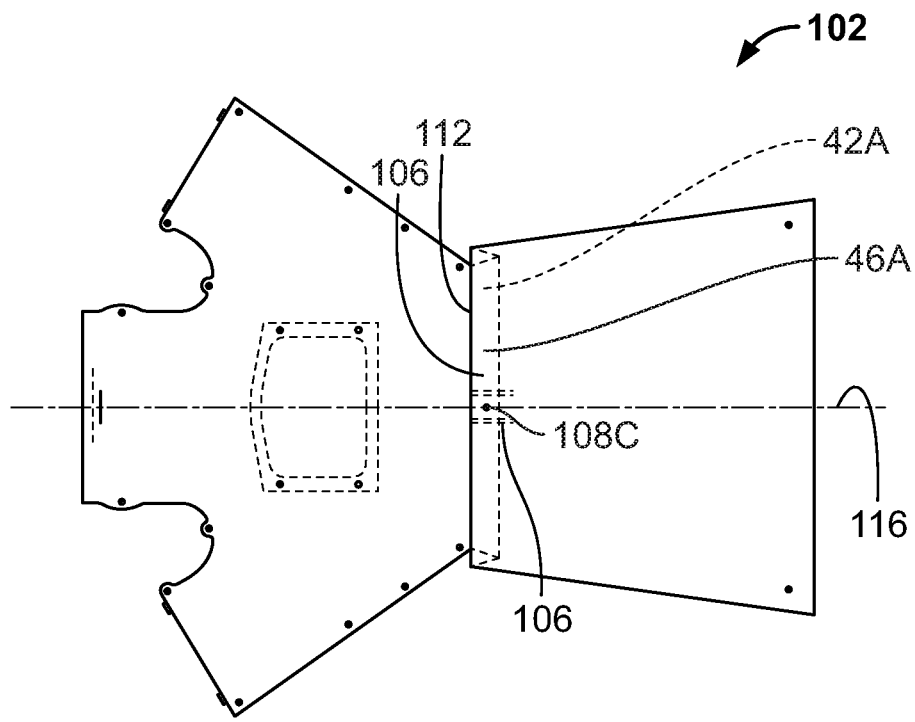

FIG. 7C illustrates a third general step for manufacturing a throat and fill tube protection device in accordance with the present teachings in which the predetermined shape of the at least first material layer is further folded along a second fold line to create an overlapping region.

FIG. 8 is a side view of another throat and fill tube protection device for an airbag assembly in accordance with the present teachings.

FIG. 9 is a side view of another throat and fill tube protection device for an airbag assembly in accordance with the present teachings.

Figure 10A:
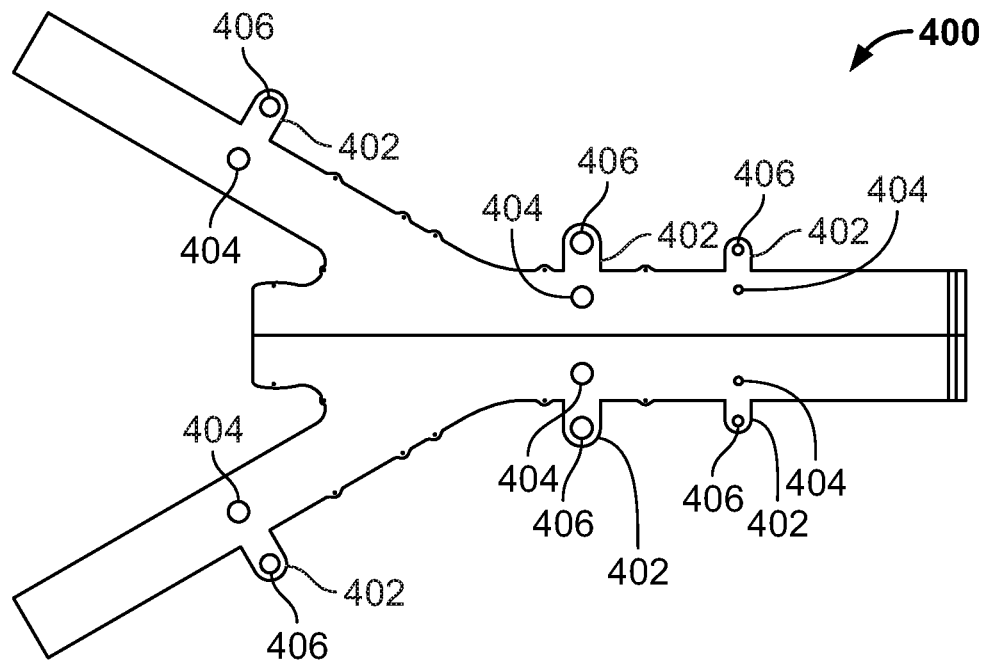

FIG. 10A is a plan view of a first material layer for manufacturing another throat and fill tube protection device in accordance with the present teachings, the first material layer including vent hole reinforcing tabs.

Figure 10B:
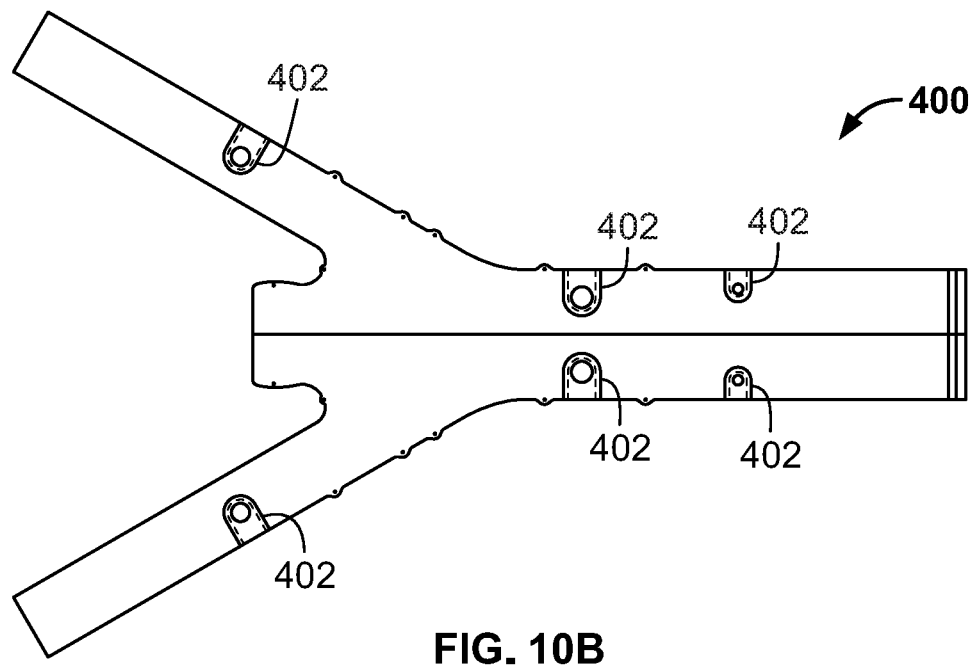

FIG. 10B is a plan view similar to FIG. 10B illustrating the vent hole reinforcing tabs folded and secured to reinforce the vent holes.

Figure 11A:
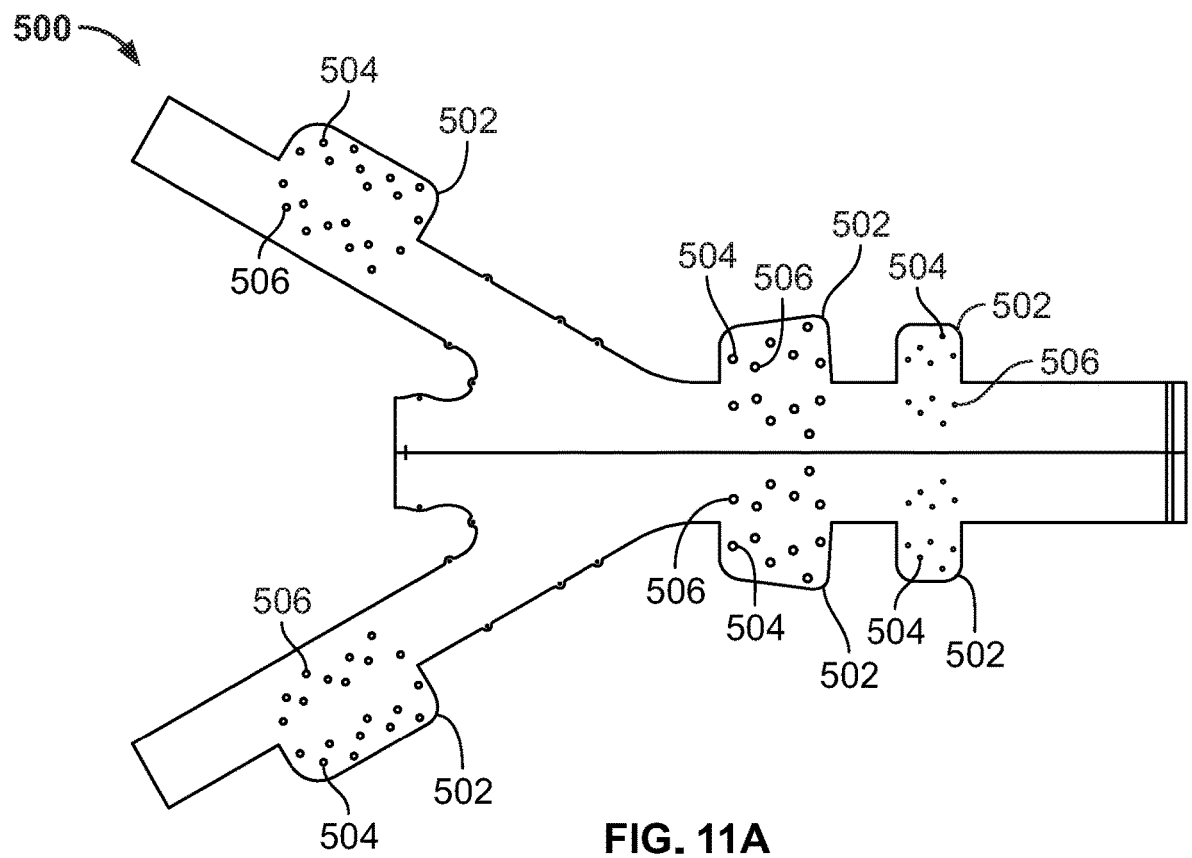

FIG. 11A is a plan view of a first material layer for manufacturing another throat and fill tube protection device in accordance with the present teachings, the first material layer again including vent hole reinforcing tabs.

Figure 11B:
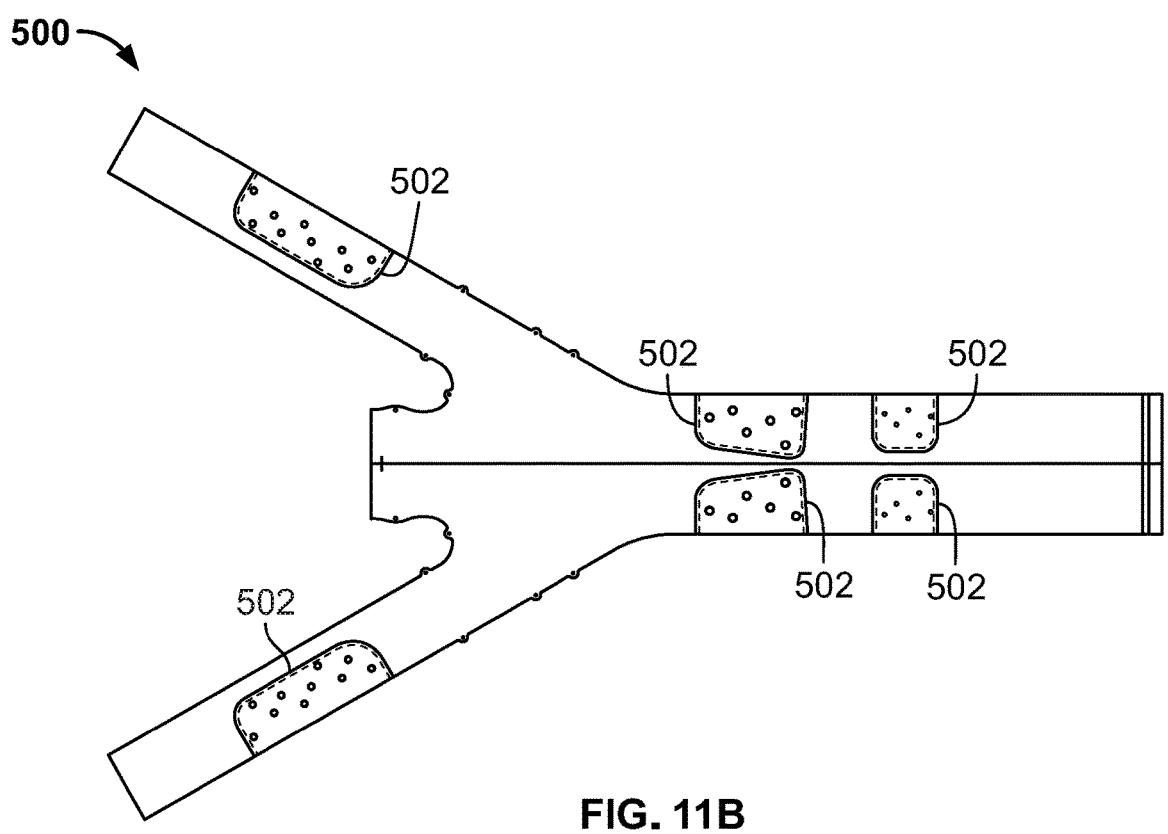

FIG. 11B is a plan view similar to FIG. 11B illustrating the vent hole reinforcing tabs folded and secured to reinforce the vent holes.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

With initial reference to FIGS. 1 through 5B, an airbag assembly in accordance with the present teachings is illustrated and generally identified at reference character 10. The airbag assembly 10 is part of an occupant restraint system 12 of a motor vehicle 14 and includes an inflatable airbag 16 and a device 18 for protecting a throat 19 or throat region and fill tube 21 of the inflatable airbag 16. In the embodiment illustrated throughout the drawings, the airbag assembly is a curtain airbag assembly 10. It will be understood, however, that certain aspects of the present teachings may be used in connection with other airbags.

The motor vehicle 14 shown in the drawings will be understood to be exemplary in nature and is associated with a longitudinal direction 20 oriented along the length of the motor vehicle 14, a lateral direction 22 oriented from one side of the motor vehicle 14 to the opposing side and a vertical direction 24 oriented vertically up and down. The terms "inboard" and "outboard" may be used herein to refer to a relative orientation in the lateral direction 22. For example, "outboard" refers to a relative location closer to or facing a lateral plane of the vehicle than a longitudinal center plane of the motor vehicle. Conversely, "inboard" refers to a relative location closer to or facing the longitudinal center plane of the vehicle than a lateral side of the motor vehicle. "Inboard" and "outboard" do not require alignment of the two objects in the lateral direction 18; rather, these terms simply relate to proximity to the lateral or medial planes as set forth above.

Figure 1:
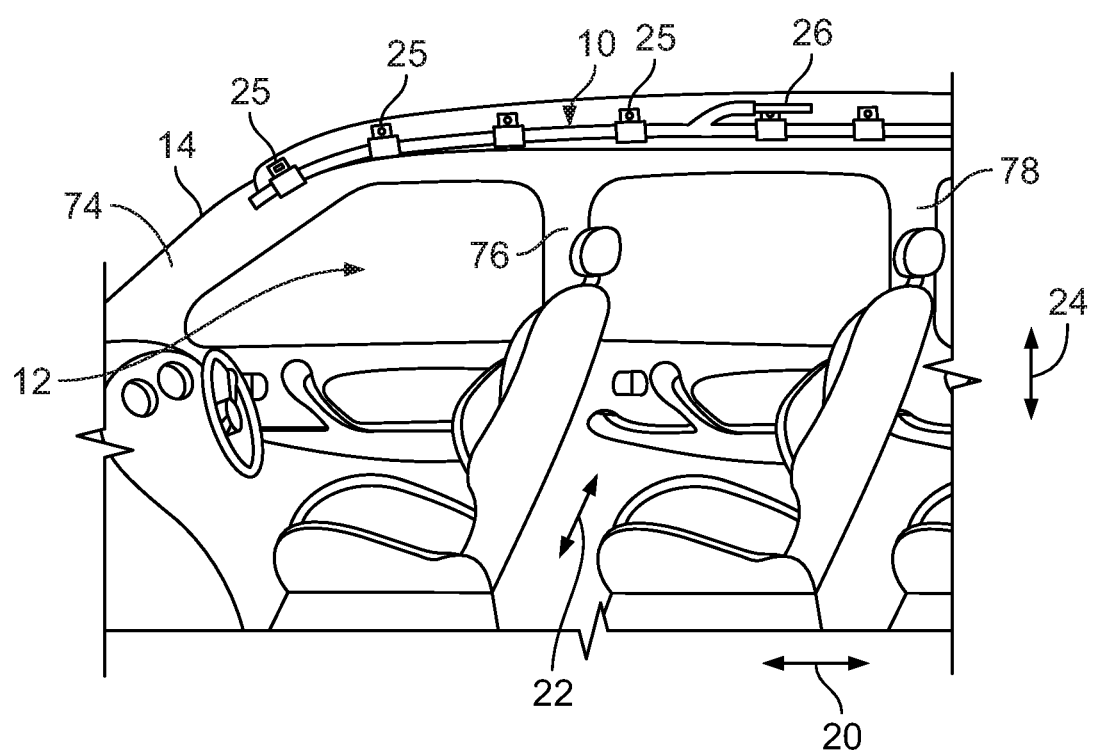
FIG. 1 is a side view of an airbag assembly in accordance with the present teachings, the airbag assembly shown in a stowed configuration within an exemplary motor vehicle.
Figure 2:
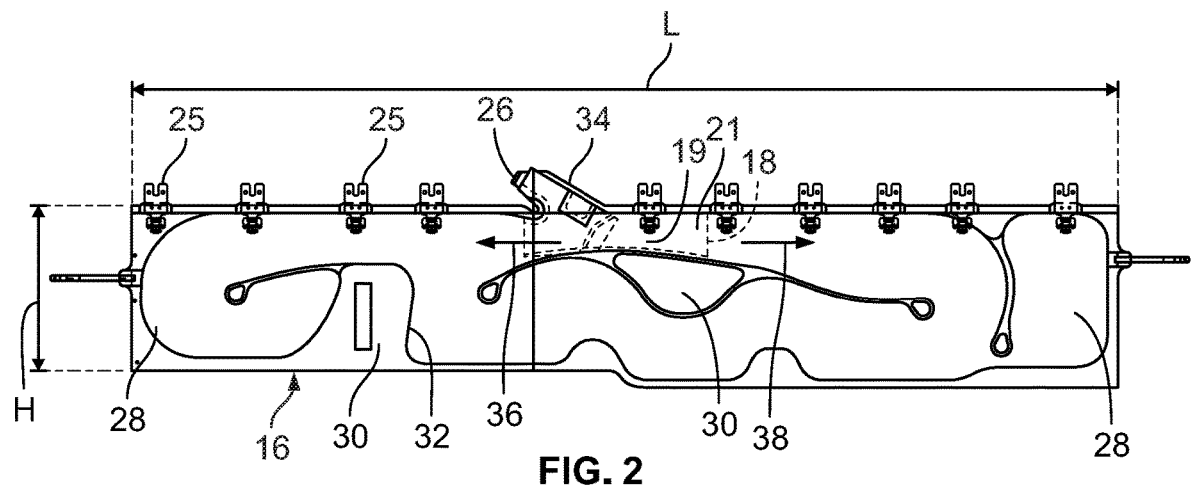
FIG. 2 is a side view of the airbag assembly of FIG. 1, an inflatable airbag of the airbag assembly shown unrolled and prior to inflation.
Figure 3:
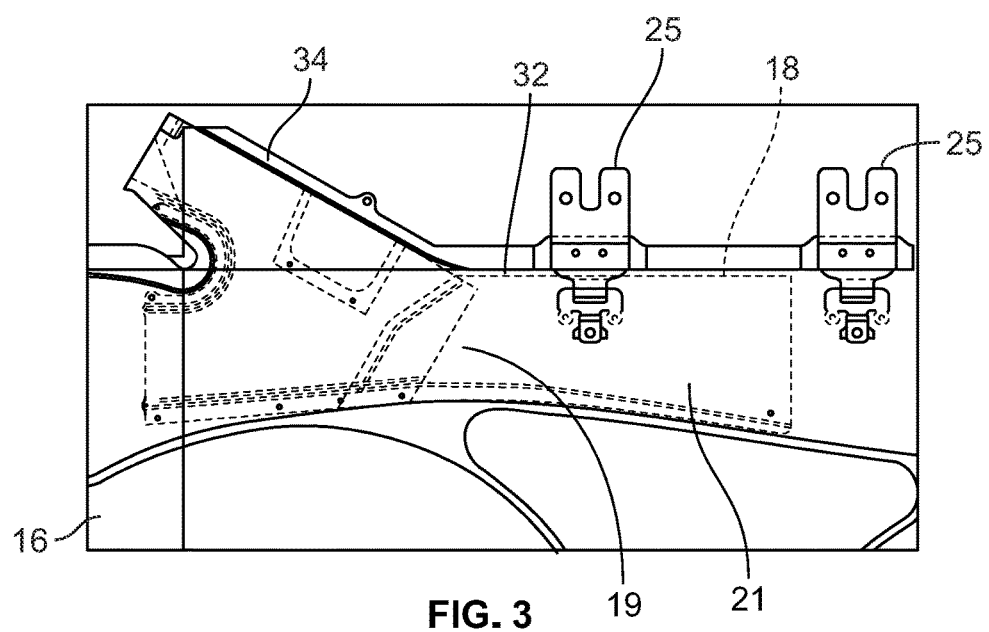
FIG. 3 is an enlarged view of a portion of the airbag assembly of FIG. 2.
Figure 4:
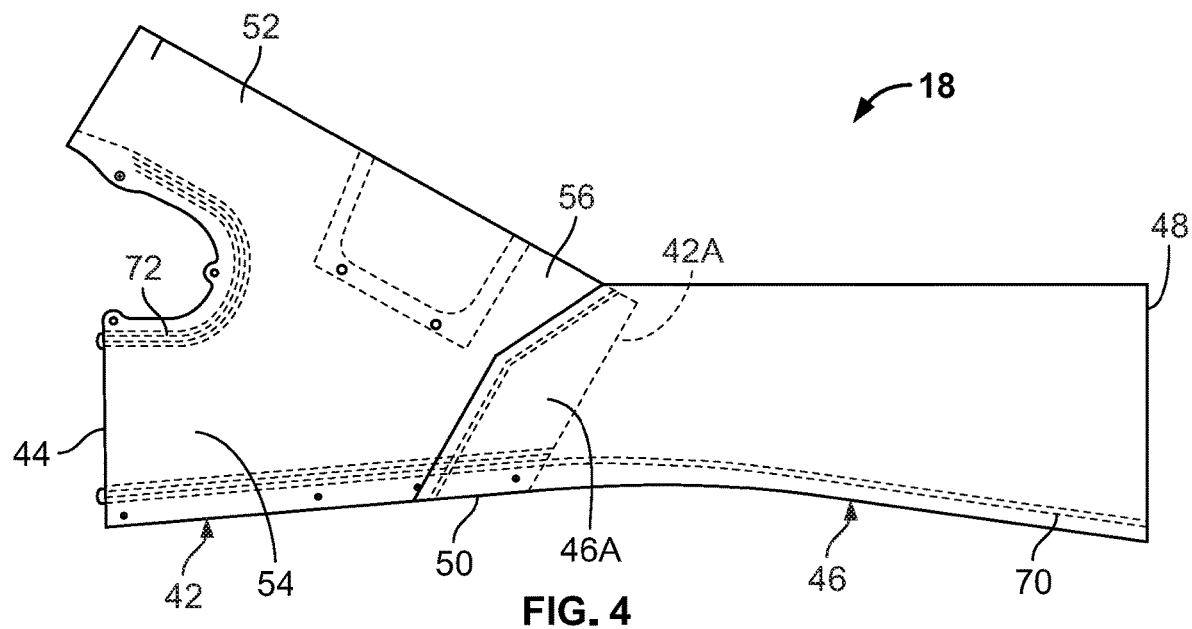
FIG. 4 is a side view of a throat and fill tube protection device of the airbag assembly in accordance with the present teachings.

The inflatable airbag 16 may extend along the longitudinal direction 20 within the vehicle 14 in both the stowed condition (as shown in FIG. 1) and the deployed condition (not shown). The inflatable airbag has a length L in the longitudinal direction 20, a height H in the vertical direction 24, and a depth in the lateral direction 22. In the particular embodiment shown in FIG. 2, the inflatable airbag 16 may have a length of approximately 3.0 meters and a height of approximately 0.5-0.6 meters. These dimensions, however, may be readily varied within the scope of the present teachings. The inflatable airbag 16 may be coupled to or next to a roof rail of the motor vehicle 14 with a plurality of mounting tabs 25.

The inflatable airbag 16 may be formed of one or more panels. The one or more panels of the inflatable airbag 16 defines an interior volume includes various inflatable chambers configured to receive, direct and/or retain inflation gas from an inflator 26 of the airbag assembly 10. Some of the inflatable chambers are cushion chambers or segments 28 configured to be filled with inflation gases generated by an inflator 26 to cushion a vehicle occupant upon deployment of the inflatable airbag 16. The inflatable airbag 16 may also include non-inflatable segments 30. The inflatable cushion segments 28 and non-inflatable segments 30 may be separated by boundary seams 32, for example. The boundary seams 32 may be formed in any well-known manner. The shape of the inflatable airbag 16 and its various components will be understood to be merely exemplary. In this regard, these shapes may be altered within the scope of the present teachings to accommodate specific vehicles and/or specific performance requirements.

In some embodiments, the inflatable airbag 16 may be formed of a single, continuous panel of material using a one-piece woven technique. In other embodiments, the inflatable airbag 16 may be formed of separated panels of material joined together. For example, the inflatable airbag 16 may include inboard and outboard panels or layers formed from separate sheets of material joined together. The inboard and outboard panels may be secured together at a peripheral edge, for example, via peripheral stitching. In the alternative, the inboard and outboard fabric panels may be secured together via mechanical fastening, adhesives, one-piece weaving (OPW), RF welding, ultrasonic welding, or any other suitable method known in the art.

As illustrated, the cushion segments 28 are in fluid communication with the throat 19 of the inflatable airbag 16 through the fill tube 21. The fill tube 21 is another one of inflatable chamber of the inflatable airbag 16. As illustrated, the fill tube 22 runs in a generally horizontal direction adjacent a top edge of the inflatable airbag 16. A top of the fill tube 22 may be closed by the peripheral stitching of the inflatable airbag 16. The fill tube 21 directs inflation gases into the inflatable chambers 28. The inflatable airbag 16 further includes an inlet channel 34 that receives at least a portion of the inflator 26. Inflation gases generated by the inflator 26 are received by the throat 19 of the inflatable airbag 16. The fill tube 21 directs a first portion of inflation gases in a first or vehicle forward direction 36 and a second portion of inflation gases in a second or vehicle aft direction 38. The first direction 36 is generally opposite the second direction 38.

The throat and fill tube protection device or protection device 18 functions to protect the throat 19 and fill tube 21 of the inflatable airbag 16 from the heat and pressure of the inflation gases generated by the inflator 26. In this regard, the protection device 18 further maintains the integrity of the fill tube 22 and throat 20. The protection device 18 includes a first portion 42 at a first end 44 thereof, a second portion 46 at a second end 48 thereof, and an overlapping region 50. In the embodiment illustrated, the first and second portions 42 and 46 are separately formed from one or more layers of material and subsequently joined.

The first portion is a generally Y-shaped portion 42 with a first arm 52 and a second arm 54 connected at a base 56. The first arm 52 defines an inlet of the protection device 18 for lining the inlet channel 34 of the inflatable airbag 16 and directly receiving the inflator 26. In this regard, the first arm 52 is radially between the inflator 26 and the inlet channel 34 of the inflatable airbag 16. The second arm 54 defines a first channel for directing the first portion of the inflation gases in the first direction 36. The second portion 46 defines a second channel for directing the second portion of the inflation gases in the second direction 38. The second arm 54 and the second portion 36 are disposed in this throat 20 and a portion of the fill tube 22. The overlapping region 50 is cooperatively defined by first and second overlapping areas 42A and 46A of the first and second portions 42 and 46, respectively, after joining of the first and second portions 42 and 46.

The second portion 46 has a first diameter proximate the overlapping region 50 and a second diameter proximate the second end 48 of the protection device. The second diameter may be greater than the first diameter. Such an increasing diameter may allow for a better mechanical locking into the fill tube 22.

Figure 5A:
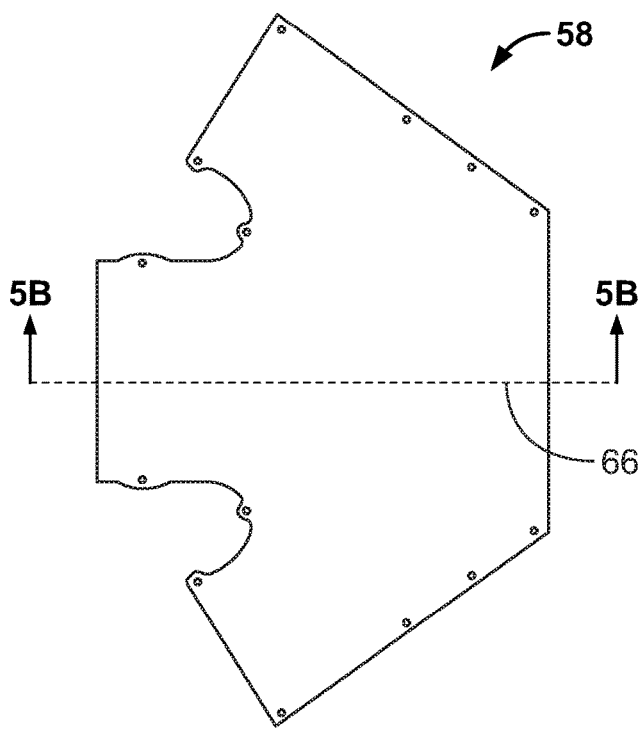
FIG. 5A is a plan view of a material layer for forming a first portion of the throat and fill tube protection device of FIG. 4.
Figure 5B:
FIG. 5B is a cross-sectional view taken along the line 5B-5B illustrating the material layer, the material layer being a fabric layer.
Figure 5C:
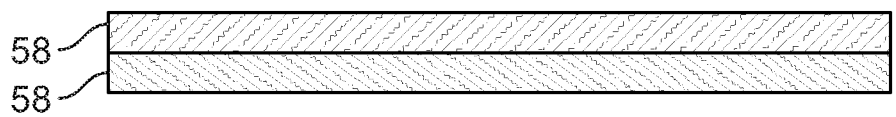
FIG. 5C is a cross-sectional view similar to FIG. 5B illustrating an embodiment including first and second fabric layers.
Figure 5D:
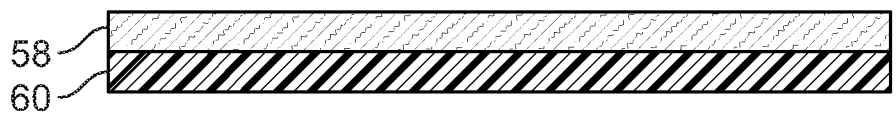
FIG. 5D is another cross-sectional view similar to FIG. 5B illustrating another embodiment including a first fabric layer and a second layer of plastic film.
Figure 5E:
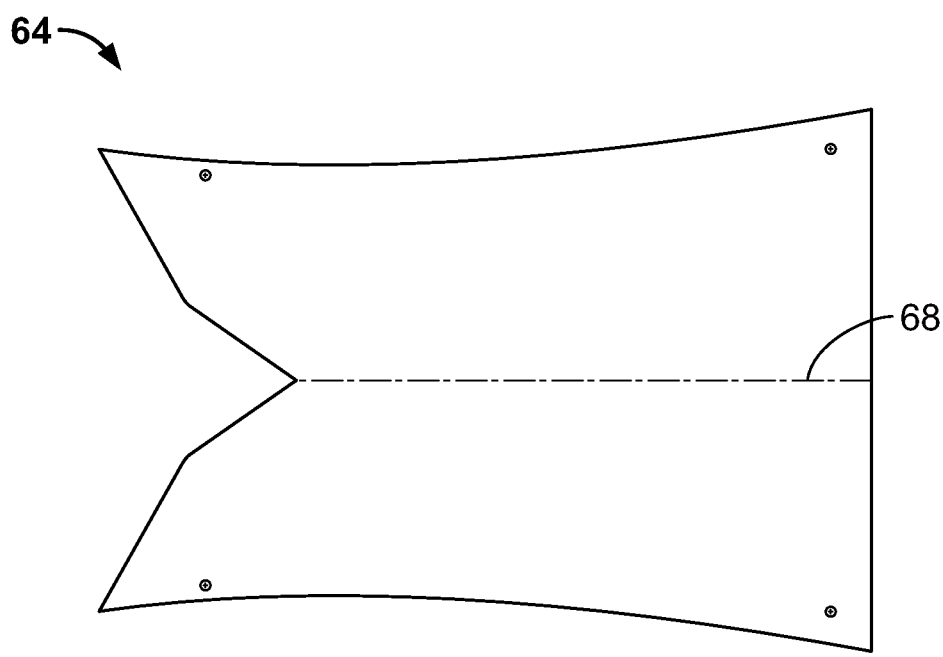
FIG. 5E is a plan view of a material layer for forming a second portion of the throat and fill tube protection device of FIG. 4.

The first portion 42 may be formed of one or more layers of material. As shown in FIG. 5B, the first portion 42 may be formed of a single layer of material 58. The single layer of material may be a first layer of fabric 58. As shown in the cross-sectional view of FIG. 5C, the first portion 42 may alternatively be formed of the first layer of fabric 58 stacked with a second layer of fabric 58. In one particular application, the fabric of the first and second layers of fabric 58 may be constructed of a polyamide such as nylon, or a polyester, or both. For example, the inside layer may be a coated polyamide and the outside layer may be an uncoated polyamide. As shown in the cross-sectional view of FIG. 5D, the first portion 42 may alternatively be formed of the first layer of fabric 58 stacked with a second layer of plastic film 60. The second portion 46 may be similarly formed of a single layer of material 64, or two or more layers of material, including fabric layers and plastic film layers. One suitable plastic film is commercially available as Valeron®.

One end of the second portion 46 is overlapped with one end of the first portion 42 to create the overlapping region 50. The first layer of material 58 of the first portion 42 is folded along a longitudinally extending centerline 66. The second layer of material 64 of the second portion 46 is similarly folded along a longitudinally extending centerline 68. The folds at the centerlines 66 and 68 define an upper side of the protection device 18. The fold at the center lies to the peripheral stitching of the inflatable airbag along the inlet channel 34 and at a top of the inflatable airbag 16. In this manner, the protection device 18 functions to provide further structural integrity of the throat 20 and fill tube 22. A lower side of the protection device is sewn or otherwise closed at a first closure seam 70. Similarly, a U-shaped between the first and second arms 52 and 54 of the first portion 42 is sewn or otherwise closed at a second closure seam 72. In the embodiment illustrated, the second portion 46 is on an outer side of the first portion 42 at the overlapping region and is sewn to or other secured to the first portion 42. Alternatively, the first portion 42 may be on the outer side of the second portion 46.

The inflator 26 may be one of several types, such as pyrotechnic, stored gas, cold gas or a hybrid inflator and may be a single or multistage inflator. If the inflator 26 is a pyrotechnic inflator, the inflator 26 may contain a propellant that ignites to rapidly produce inflation gases in response to receipt of the activation signal. In one particular application, the inflation gases have an exhaust gas temperature (EGT) that is less than or equal to approximately 250 degrees F. A diffuser end of the inflator 26 is positioned within the first portion 42 proximate a protective heat shield 73 sewn or otherwise secured to an inner side or outer side of the first portion 42.

The one or more panels forming the inflatable airbag 16 may be selected from various materials known in the art. The present teachings combine various features that allow for a wider selection of materials to be used for the one or more panels of the airbag 16. In this regard, the lower exhaust gas temperature of the inflator 26 and reinforcing and heat resisting characteristics of the protection device 18 make it possible for the one or more panels of the inflatable airbag 16 to be at least partially constructed of a material having a lower heat capacity and strength as compared to conventional airbags. For example, the one or more panels of the inflatable airbag 16 may be at least partially constructed of a material having a specific heat capacity of no greater than 2.0 J/g° C. According to one example, the one or more panels of the inflatable airbag 16 may be generally constructed of a material selected from a group consisting of polyethlyene terephthalate (PET), nylon, and combinations thereof. More preferably, the one or more panels of the inflatable airbag 16 may be at least partially constructed of a material having a specific heat capacity of no greater than approximately 1.75 J/g° C. In some embodiments, the one or more panels of the inflatable airbag 16 may be at least partially constructed of a material having a specific heat capacity of not great than approximately 1.30 J/g° C. In one particular example, the one or more panels of the inflatable airbag 16 may be constructed of polyester (PET) having a specific heat capacity of approximately 1.75 J/g° C. In another particular example, the one or more panels of inflatable airbag may be constructed of nylon having a specific heat capacity of approximately 1.30 J/g° C. Again, it will be understood that the one or more panels of the inflatable airbag 16 may be constructed of other fabrics or flexible materials within the scope of the present teachings.

It will now be appreciated that the present teachings provide an inflatable airbag that is capable of utilizing a panel material having a lower heat capacity and lower mechanical strength by utilizing a throat and fill tube protection device 18 and an inflator with an EGT of no greater than 250 degrees F. The present teachings allow for use of such low heat capacity and low strength materials for inflatable airbags up to at least approximately 100 liters with a single inflator 26. Multiple inflator systems may be used to greatly increase the volume. A lower EGT inflator combined with a throat and fill tube protection device 18 results in a lower cushion temperature during deployment. These lower cushion temperatures keep the materials from becoming too soft or too weak. In this manner, localized stressed regions from initial breakout pressures that may otherwise weaken the airbag and allow gases to exit the airbag are effectively reduced or eliminated. The protection device 18 further functions to eliminate leakage of inflation gases through the peripheral seam adjacent the protection device 18. Explaining further, the protection device improves cushion pressure retention by reducing localized seam combing and preventing fill tube ruptures.

The inflatable airbag 16 may normally reside in a stowed configuration, in which the inflatable airbag 16 is concealed behind the interior trim of the vehicle 14, such as the lateral headliner trim. Prior to installation in the motor vehicle 14, the inflatable airbag 16 may be compacted into the stowed configuration, such as by rolling, folding, or a combination thereof. Once compacted into the stowed configuration, the inflatable airbag 16 may be retained in the stowed configuration through the conventional use of wrappers, fasteners, or the like to facilitate shipping and installation. As noted, the inflatable airbag 16 may be conventionally secured to the motor vehicle 14 with the plurality of mounting tabs 25 distributed along the length of the inflatable airbag 16.

In the event of a predetermined event such as an actual or impending collision, a sensor (not shown) sends a signal to a control system (not shown). In the case of an inflatable curtain airbag, the sensor may send a signal to the control system upon detection of an actual or impending side impact collision and/or vehicle rollover. In turn, the control system controls the inflator 26 to generate inflation gases to inflate the inflatable airbag 16.

The inflatable airbag 16 may expand downward in the vertical direction 24 along the side of the vehicle 14 between one or more passengers of the vehicle 14 and one or more lateral surfaces of the vehicle 14 such as the side windows and pillars (the structures between the lateral windows and/or the windshield and rear window) of the vehicle. The pillars may include an A-pillar 74, a B-pillar 76, and a C-pillar 78, for example, all of which may join the roof rail at their respective upper ends. In the embodiment illustrated, the inflatable airbag 16 extends from the A-pillar 74 to the C-pillar 78 of the motor vehicle 14. In this particular embodiment, the inflatable airbag 16 if particulary adapted for a 3-row vehicle. The present teaching, however, are not so limited.

With reference to FIG. 6 another throat and fill tube protection device in accordance with the present teachings is illustrated and generally identified at reference character 100. A method of manufacturing the protection device 100 will be described with reference to FIGS. 7A-7C. Given the similarities between the protection device 100 and the protection device 18, common reference characters will be used to identify common elements. Additional embodiments introduced below will be similarly treated. The protection device 100 primarily differs from protection device 18 in that the first and second portions 42 and 46 are formed from one or more common layers of material 102. The term "common layer" connotes that a common sheet material is used to form both the first and second portions 42 and 46 of the protection device 100. As discussed above, the one or more layers of material 102 may include one or more fabric layers or one or more fabric layers with a layer of plastic film.

The protection device 100 includes an overlapping region 104 defined by overlapping portions 42A and 46A of the first and second portions 42 and 46, respectively. The overlapping region 104 has a first length at a first or upper side of the protection device 100 and a second length at a second side or lower side of the protection device 100. The first length is greater than the second length such that a predetermined angle α is defined between the first and second portions 42 and 46. In the embodiment illustrated, the second length may be approximately 0 degrees and the predetermined angle α may be approximately 10 degrees. A sewn line 106 secures the first portion 42 to the second portion 46 at the overlapping region 104.

FIG. 7A is a plan view of a single common layer of material 102 used for the protection device 100. In accordance with a method of manufacturing a throat and fill tube protection device of the present teachings, a least one layer of material 102 is cut to a predetermined shape. Each layer of material 102 is stacked to create a stack having a common predetermined shaped. As shown in FIGS. 7A-7C, the stack only includes a single layer of material 102. It will be understood, however, that the method of folding the stack and sewing the material to manufacture the protection device 100 will be the same if the stack incorporates two or more layers of material 102. In certain embodiments, a double layer of material may be provided proximate the diffuser of the inflator 26.

The at least one layer of material 102 may include three markers 108A, 108B and 108C to facilitate folding of the at least one layer of material 102 to define the overlapping region 104. In the embodiment illustrated, the markers are holes 108A, 108B and 108C extending completely through the single layer of material 102. Where the stack includes two or more layers of material 102, all three holes 108A, 108B and 108C extend through at least the upward facing layer of material 102 and at least the second and third holes 108B and 108C extend through at least the downward facing layer of material 102.

As shown in FIG. 7B, the at least one layer of material 102 is first folded at a first laterally extending fold line 110 with the second hole 108B aligned with the first hole 108A. In this position, the portion of the at least one layer of material 102 used to define the second portion 46 is flipped over and on top of the portion of the at least one layer of material 102 used to define the first portion 42. The tuck and fold are at a junction that defines the predetermined angle α between the first and second portions 42 and 46. The flap of the tucked portion extends in a direction of gas flow such that the flow of inflation gases is not impeded.

As shown in FIG. 7C, the at least one layer of material 102 is next folded at a second laterally extending fold line 112 with the third hole 108B aligned with previously aligned first and second holes 108A and 108B. In this position, the portion of the at least one layer of material 102 used to define the second portion 46 is flipped back over to create the overlapping region 104 or tuck fold. One or more stitch lines 106 secure the overlapping portions 42A and 46A proximate a longitudinally extending centerline 116 of the at least one layer of material 102.

The at least one layer of material 102 is folded at the longitudinally extending centerline 116. The bottom edges of the protection device 100 are pulled straight to create the predetermined angle between the first portion 42 and the second portion 46. Sew lines 70 and 72 close the bottom edge of the protection device 100 and the U-shaped area between the first and second arms 52 and 54 of the first portion 42.

It will be appreciated that the present teachings provide a throat and fill tube protection device having single or dual piece construction with an angled extension than can be tuned to fit a variety of fill tube geometries.

Turning to FIG. 8 another throat and fill tube protection device in accordance with the present teachings is illustrated and generally identified at reference character 200. The protection device 200 primarily differs from the previously described protection devices 18 and 100 in two aspect. In a first aspect, the protection device includes a first portion 42 having a second arm 202 that is significantly longer than the second arm 54 and/or a second portion 204 that is significantly longer than the second portion 46. In a second aspect, each of the second arm 202 of the first portion 42 and the second portion 204 includes a plurality of vent holes 206. The vent holes 206 may extend through one or both lateral sides of the protection device 200.

Turning to FIG. 9 another throat and fill tube protection device in accordance with the present teachings is illustrated and generally identified at reference character 300. The protection device 300 primarily differs from the protection device 200 by incorporating a fewer number of larger vent holes 302. In the embodiment illustrated, the second arm 202 of the first portion 42 may include a single vent hole 302 and the second portion 204 may include a pair of vent holes 302. The vent holes 302 may each be associated with a reinforcing patch 304 sewn or otherwise suitably secured to the protection device 300 to circumferentially surround a respective vent hole 302. The vent holes 302 may extend through one or both lateral sides of the protection device 300.

Turning to FIGS. 10A and 10B, another throat and fill tube protection device in accordance with the present teachings is illustrated and generally identified at reference character 400. The protection device 400 is shown prior to folding and sewing. The protection device 400 primarily differs from the previously described protection devices by incorporating integrated reinforcement tabs 402 for reinforcing vent holes 404 of the protection device 400. Explaining further, the layers of material are cut to include the reinforcement tabs 402. Each reinforcement tab 402 includes a hole 406 for aligning with one of the vent holes 404. In FIG. 10A, the reinforcement tabs 402 are shown prior to folding. In FIG. 10B, the reinforcement tabs 402 are folded such that the holes 406 align with the vent holes 404. The reinforcement tabs 402 are sewn or otherwise suitably secured to the protection device 400.

Turning to FIGS. 11A and 11B, another throat and fill tube protection device in accordance with the present teachings is illustrated and generally identified at reference character 500. The protection device 500 primarily differs from the protection device 400 by incorporating a plurality of reinforcement tabs 502 that each include a plurality of holes 504. The plurality of holes 504 of each of the reinforcement tabs 502 align with a corresponding plurality of vent holes 506 in the protection device 500. In FIG. 11A, the reinforcement tabs are shown prior to folding. In FIG. 11B, the reinforcement tabs 502 are folded such that the holes 506 align with the vent holes 504. The tabs 502 are sewn or otherwise suitably secured to the protection device 500.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A throat and fill tube protection device for an inflatable airbag, the device comprising:
    a first portion at a first end of the device, the first portion being a generally Y-shaped portion with a first arm and a second arm connected at a base, the first arm defining an inlet for receiving an inflator, the second arm defining a first channel for directing a first portion of the inflation gases in a first direction;
    a second portion at a second end of the device, the second portion defining a second channel for directing a second portion of the inflation gases in a second direction, the second direction being generally opposite the first direction; and
    an overlapping region cooperatively defined by first and second overlapping areas of the first and second portions, respectively,
    wherein the overlapping region has a first length at a first side of the device and a second length at a second side of the device, the first length being greater than the second length such that a predetermined angle is defined between the first and second portions.

2. The throat and fill tube protection device for an inflatable airbag of claim 1, wherein the predetermined angle is at least 5 degrees.

3. The throat and fill tube protection device for an inflatable airbag of claim 1, wherein the second length is approximately zero.

4. The throat and fill tube protection device for an inflatable airbag of claim 1, in combination with the inflatable airbag, the inflatable airbag having a peripheral seam, the throat and fill tube protection device having a longitudinally extending fold adjacent to a portion of the peripheral seam.

5. The throat and fill tube protection device for an inflatable airbag of claim 4, wherein the inflatable airbag is an inflatable curtain airbag.

6. A throat and fill tube protection device for an inflatable airbag, the device comprising:

a first portion at a first end of the device, the first portion being a generally Y-shaped portion with a first am and a second arm connected at a base, the first arm defining an inlet for receiving an inflator, the second arm defining a first channel for directing a first portion of the inflation gases in a first direction;

a second portion at a second end of the device, the second portion defining a second channel for directing a second portion of the inflation gases in a second direction, the second direction being generally opposite the first direction; and an overlapping region cooperatively defined by first and second overlapping areas of the first and second portions, respectively, wherein the device includes one or more common material layers, each common material layer cut to a predetermined shape, each predetermined shape folded to define the overlapping region.

7. The throat and fill tube protection device for an inflatable airbag of claim 6, wherein the one or more material layers includes at least two fabric layers.

8. The throat and fill tube protection device for an inflatable airbag of claim 6, wherein the one or more material layers includes at least a first fabric layer and at least a first plastic film layer.

9. The throat and fill tube protection device for an inflatable airbag of claim 6, wherein the one or more common material layers include first and second folds generally extending in a lateral direction to define the overlapping region.

10. A curtain airbag assembly for a motor vehicle, the airbag assembly comprising:
an inflatable airbag formed from one or more panels defining one or more inflatable chambers that expand upon deployment of the inflatable airbag from a stowed state to a deployed state, the inflatable airbag configured to be positioned in the deployed state between an occupant of the vehicle and an outboard portion of the vehicle to protect the occupants from roll-over or side-impact collision, the inflatable airbag includes an airbag inlet in fluid communication with a throat and a fill tube in fluid communication with the throat; and
a throat and fill tube protection device including a Y-shaped portion and a further portion, the Y-shaped portion having a first arm and a second arm connected at a base, the first arm defining an inlet channel for receiving an inflator, the first arm disposed in the airbag inlet, the second arm defining a first channel for directing a first portion of the inflation gases in a first direction, the further portion defining a second channel for directing a second portion of the inflation gases in a second direction, the second direction being generally opposite the first direction, a predetermined angle defined between the Y-shaped portion and the further portion by an overlapping region of the Y-shaped portion and the further portion,
wherein the throat and fill tube protection device lines the throat and at least a portion of the fill tube.

11. The curtain airbag assembly for a motor vehicle of claim 10, wherein the device includes one or more common material layers, each common material layer cut to a predetermined shape, each predetermined shape folded to define the overlapping region.

12. The curtain airbag assembly for a motor vehicle of claim 11, wherein the one or more material layers includes at least two fabric layers.

13. The curtain airbag assembly for a motor vehicle of claim 11, wherein the one or more material layers includes at least a first fabric layer and at least a first plastic film layer.

14. The curtain airbag assembly for a motor vehicle of claim 11, wherein the one or more common material layers include first and second folds generally extending in a lateral direction to define the overlapping region.

15. The curtain airbag assembly for a motor vehicle of claim 10, wherein the predetermined angle is at least 2 degrees.

16. The curtain airbag assembly for a motor vehicle of claim 10, wherein one of an upper side and a lower side of the device is defined by a fold when the curtain airbag assembly is in the stowed state and the other of the upper side and the lower side is closed by a closure seam.

17. The curtain airbag assembly for a motor vehicle of claim 16, wherein the upper side is defined by the fold and the fold is adjacent to a portion of a peripheral seam of the inflatable airbag.

18. A method of manufacturing a throat and fill tube protection device for an inflatable airbag, the method comprising:
cutting at least one layer of material to a predetermined shape;
stacking each layer of material;
folding each layer of material to define an overlapping region extending from a first longitudinally extending side of each layer to a second longitudinally extending side of each layer;
folding each layer along a longitudinally extending fold line;
securing the first and second longitudinally extending sides to one another at a closure seam such that the device includes a first portion on a first side of the overlapping region and a second portion on a second, opposite side of the overlapping region, the first portion being Y-shaped and configured to receive inflation gases from an inflator and direct a first portion of the inflation gases in a first direction, the second portion configured to direct a second portion of the inflation gases in a second, generally opposite direction.

19. The method of manufacturing a throat and fill tube protection device for an inflatable airbag of claim 18, wherein the overlapping region includes a first length of material at the first longitudinally extending side and overlapping a second length of material at the second longitudinally extending side, the first length being greater than the second length.

* * * * *